United States Patent [19]

Barnhart

[11] Patent Number: 4,882,021
[45] Date of Patent: Nov. 21, 1989

[54] APPARATUS AND METHOD FOR SOIL DECONTAMINATION

[76] Inventor: Daniel H. Barnhart, 2043 E. Quartz, Mesa, Ariz. 85203

[21] Appl. No.: 144,928

[22] Filed: Jan. 15, 1988

[51] Int. Cl.[4] .............................................. B01J 19/08
[52] U.S. Cl. ............................ 204/157.15; 204/158.2; 204/158.21; 422/186.3; 422/184
[58] Field of Search ........... 204/157.15, 157.6, 157.61, 204/157.4, 157.41, 158.2, 157.3, 158.21, 157.94, 157.95, 193; 422/186.3, 184

[56] References Cited

U.S. PATENT DOCUMENTS

| | | | |
|---|---|---|---|
| 2,898,278 | 8/1959 | Plust | 204/157.4 |
| 3,845,317 | 10/1974 | Lindwall | 422/186.3 |
| 4,199,419 | 9/1980 | Holroyd | 422/186.3 |
| 4,287,038 | 9/1981 | Geiser | 204/158.21 |
| 4,446,236 | 5/1984 | Clyde | 422/186.3 |
| 4,447,541 | 5/1984 | Peterson | 208/262.5 |
| 4,632,742 | 12/1986 | Tundo | 204/158.21 |
| 4,667,609 | 5/1987 | Hardison | 134/2 |

FOREIGN PATENT DOCUMENTS

2814126A1 10/1979 Fed. Rep. of Germany .................. 204/158.21
61-12893 4/1986 Japan .............................. 422/186.3

*Primary Examiner*—John F. Niebling
*Assistant Examiner*—Ben C. Hsing
*Attorney, Agent, or Firm*—Harry M. Weiss

[57] ABSTRACT

Disclosed is an apparatus and method for relatively rapid, on-site soil decontamination in a confined area without significant toxic off-gassing. The disclosed method includes treating the contaminated soil with both a dry and wet chemical, mixing the chemically treated soil, and exposing the mixed soil to ultra violet light rays.

14 Claims, 3 Drawing Sheets

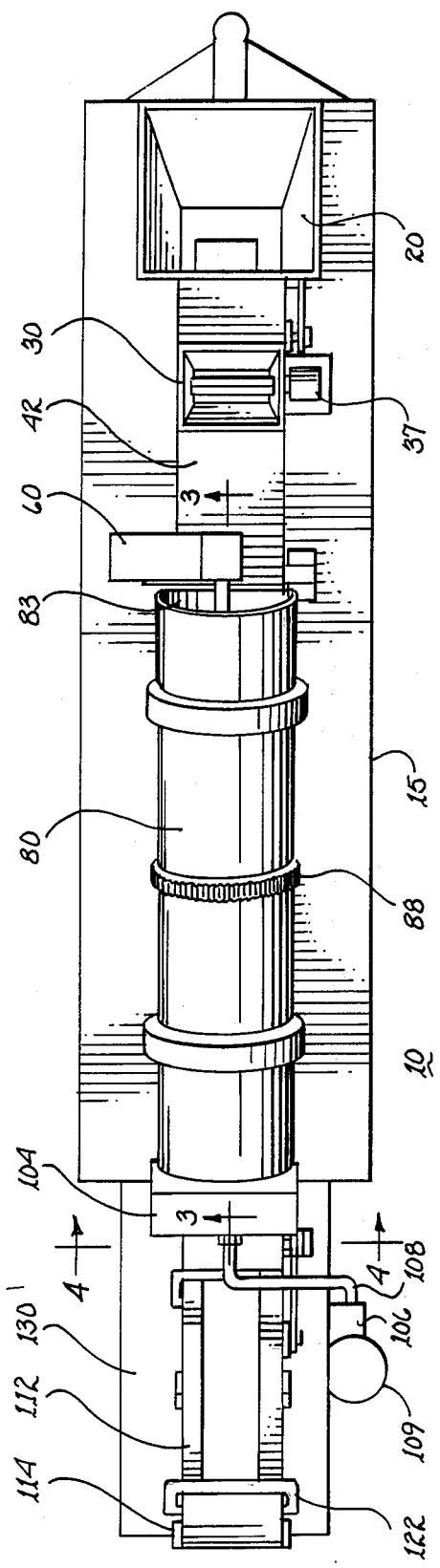
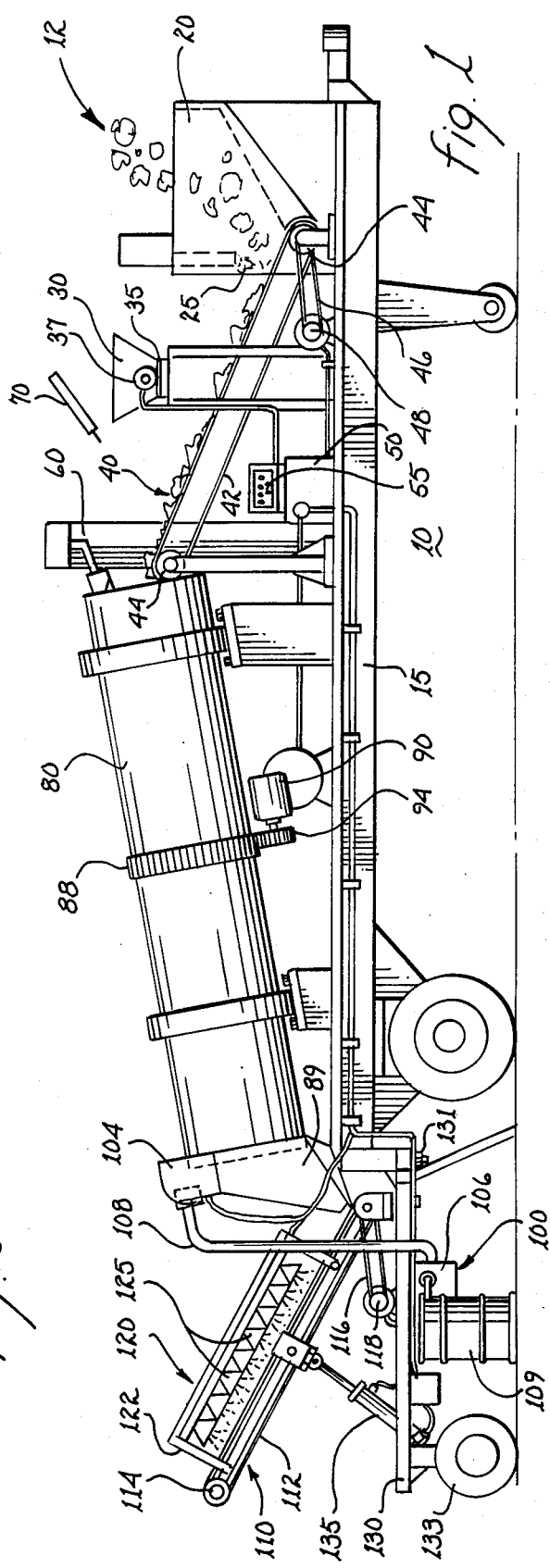

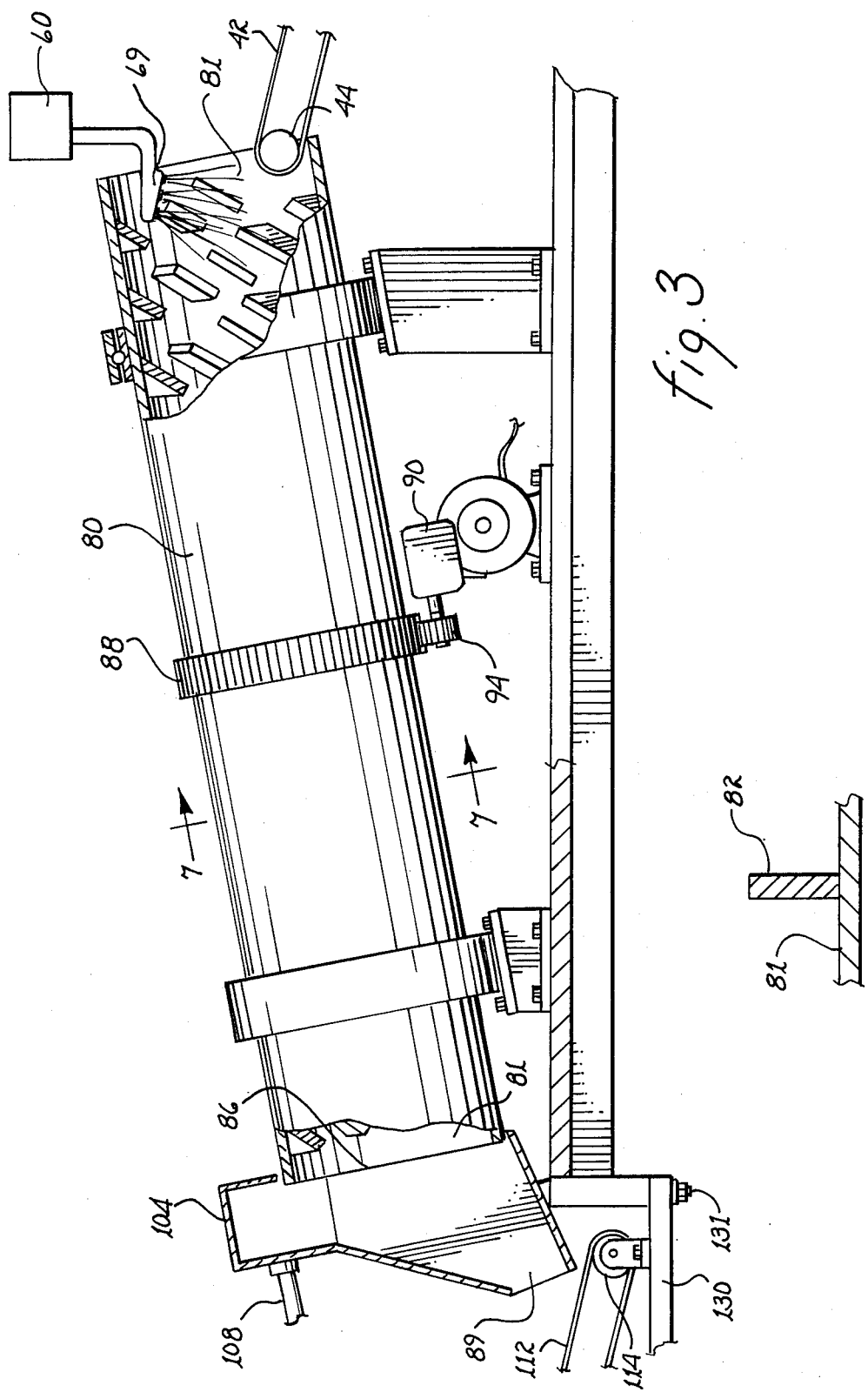

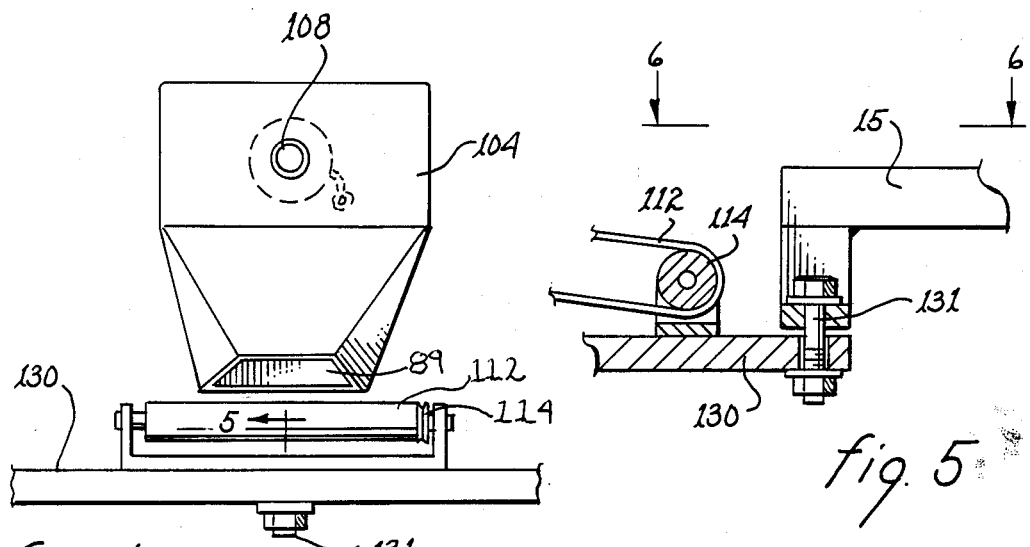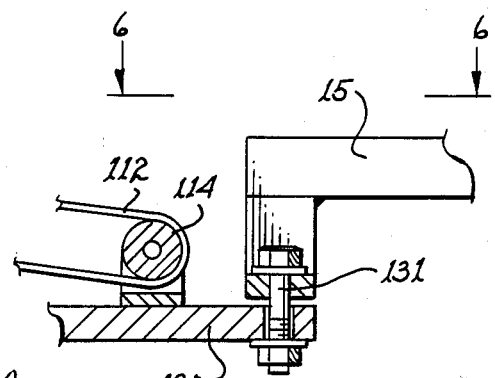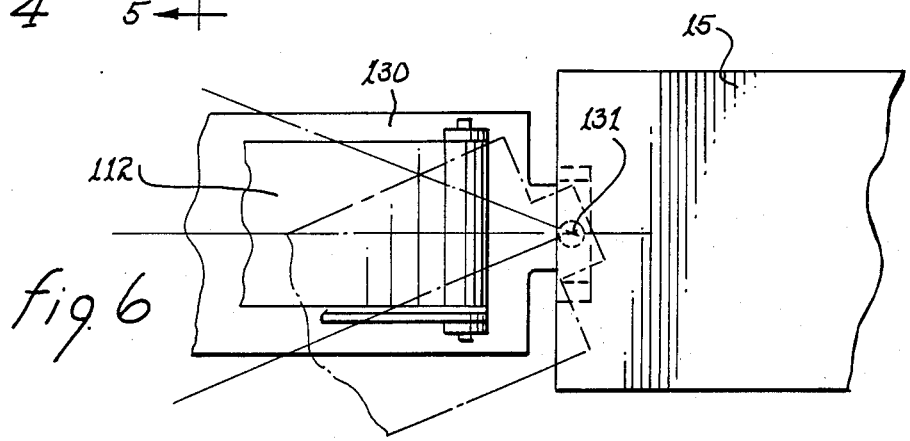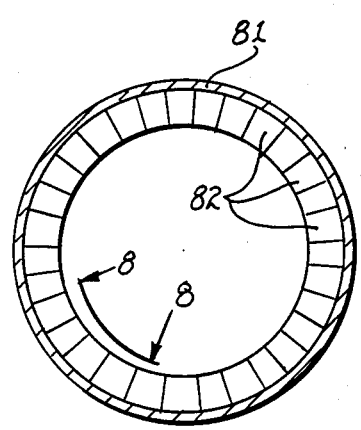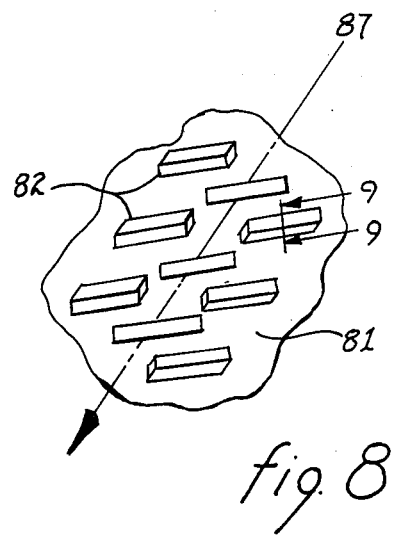

APPARATUS AND METHOD FOR SOIL DECONTAMINATION

BACKGROUND OF THE INVENTION

1. Field of the Invention

The present invention generally relates to an apparatus and method for decontamination of soil and, more specifically, to an apparatus and method for relatively rapid, on-site soil decontamination in a confined area without significant toxic off-gassing.

2. Description of the Prior Art

In the recent few decades contaminated soil has become a serious concern. A great portion of the contaminated soil is tainted by fuel hydrocarbons or heavy metals. In response to this concern, both Federal and State governments has promulgated strict standards for clean soil and air. Therefore, upon discovery of contaminated soil a clean-up procedure must be employed or the responsible parties will face at least financial penalties.

Fuel hydrocarbons from gasoline or motor oil constitute a significant portion of the soil pollution problem. Gasoline leaking from service stations, municipal and institutional fuel storage tanks are, unfortunately, a regular discovery. Although the exact scope of the problem is not presently known, it is significant, and several States have mandated underground storage tank monitoring programs. Unlined gasoline tanks or containers have an extremely limited life and may start leaking after only five years of use and can not be expected to remain leak-free for any more than ten years. It has been estimated that more than 2400 leaking underground fuel storage tanks are located in California alone.

In response to this large scale soil contamination, various methods have been introduced in an effort to render a contaminated site usable and safe. However, the methods of the past are replete with significant drawbacks and high costs. The most common systems of the past include aeration, biodegradation, air-stripping, incineration, and removal of the contaminated soil to a Class One dump site.

Aeration is a technique whereby contaminated soil is spread in thin layers over an open area. When solar rays contact the soil, a partial oxidation of the fuel hydrocarbons results but toxins are released into the atmosphere. Due to this undesired release of pollutants, governmental standards require that only a limited amount of soil may be treated in a certain time structure. Therefore, simple aeration of only 500 cubic yards of soil with contaminate levels of 2,300 p.p.m. total fuel hydrocarbon would take approximately six years to complete under the current guidelines. Obviously, aeration is costly and renders the site useless until the soil is decontaminated.

A more rapid method of clean-up is the technique of removal of the contaminated soil to a Class One landfill. Like aeration, depositing the tainted soil in a landfill creates a significant introduction of pollutants into the atmosphere. Although the removal technique results in a clean site in a relatively short time, the costs and exposures associated therewith are high. Typically, soil transportation and disposal costs are currently between $250 and $380 per cubic yard, and additional costs are incurred if replacement soil is required. Also, the transportation of tainted soil creates an exposure to potential liability for any in route mishap or improper disposal.

Airstripping includes boring numerous holes into the contaminated soil and lowering perforated casings therein. The perforated casings are centrally connected with an air flow source whereby air is drawn around the decontaminated earth and pumped through an air filter system designed to trap the now airborne pollutants. Airstripping is only effective in sand or loam based soils because of the required air movement, and usually takes from five to fifteen years to complete which renders the site useless for that time. Additionally, the central air filter must be changed regularly or the system will deposit harmful pollutants into the atmospheric environment. Flooding of an airstripping system may create a worse problem than originally existed because the flood water is passed through the contaminated soil and may percolate down into the water table and pollute water supplies.

Biodegradation has also been employed as a technique to clean contaminated soil. Living organisms which digest or otherwise eliminate fuel hydrocarbons are introduced into the toxic soil. Over a lengthy period of time, these organisms may render the soil useful again. However, biodegradation does not solve the problem of rendering the site useless for an extended time period, nor is the total effect of the organisms on the ecosystems of the site a known factor. Further, biodegradation should not be used above oil fields because the organisms will continue to feed on the oil and thereby reduce the amount of oil reserves in the field. This is a serious drawback considering that a large percentage of the areas where soil contamination occurs are proximately located with oil fields.

Incineration treatment involves high temperature burning of contaminated soil. However, this method has yet to be proven effective, or governmentally approved, largely due to the offgassing of dioxins which are classified as hazardous and/or toxic.

None of the past systems effectively eliminate the problems and high costs associated with site clean-up, namely, air pollution, time restrictions, transportation and disposal costs and exposure, and rendering the site useless. Therefore, the subject apparatus and method fill an obvious need in the industry by eliminating these problems and high costs.

SUMMARY OF THE INVENTION

It is an object of this invention to provide an apparatus and method for rapid, on-site, safe decontamination of soil containing a variety of pollutants including fuel hydrocarbons and/or heavy metals.

It is another object of the present invention to provide a mobile apparatus which may be easily transported from one clean-up site to another.

It is a further object of this invention to provide an apparatus and method for soil decontamination which may be employed in a confined area and which does not emit significant air pollutants.

It is yet another object of the subject invention to provide and apparatus and method which detoxifies certain contaminated soils within a relatively short amount of time.

It is a still further object of this invention to provide a relatively economical apparatus and method for soil decontamination which meets mandated clean-up levels.

It is still another object of the subject invention to provide an apparatus and method for soil decontamination which eliminates exposure to potential liability for transportation mishaps and which reduces the already great demand for space in Class One landfill sites.

The aforementioned and further objects are accomplished, according to the present invention, by implementing the subject apparatus and method which includes treating contaminated soil with at least one chemical for oxidizing hydrocarbons and the like, mixing the chemically treated soil, and exposing the mixed soil to ultra violet light rays.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 1 is a side view of the apparatus for soil decontamination.

FIG. 2 is a top view of the subject invention.

FIG. 3 is a cross-sectional view taken along the line 3—3 of FIG. 2 in the direction of the arrows.

FIG. 4 is a cross-sectional view taken along the line 4—4 of FIG. 2 in the direction of the arrows.

FIG. 5 is a cross-sectional view taken along the line 5—5 of FIG. 4 in the direction of the arrows.

FIG. 6 is a cross-sectional view taken along the line 6—6 of FIG. 5 in the direction of the arrows.

FIG. 7 is a cross-sectional view taken along the line 7—7 of FIG. 3 in the direction of the arrows.

FIG. 8 is a partial perspective view taken along the arc 8—8 of FIG. 7 in the direction of the arrows.

FIG. 9 is a cross-sectional view taken along the line 9—9 of FIG. 8 in the direction of the arrows.

DESCRIPTION OF THE PREFERRED EMBODIMENT

Referring now to FIGS. 1 and 2 of the accompanying drawings which set forth the present invention in greater detail and in which like numerals designate like features, the soil processing apparatus 10 is generally illustrated in a preferred embodiment. The soil processing apparatus 10 may be disposed on the bed of a trailer 15 and includes a soil hopper 20, a catalyst hopper 30, a first conveyor system 40, a power source 50, a sprayer unit 60, a turning trommel 80, a motor 90, an air filter unit 100, a second conveyor system 110, and an ultraviolet light unit 120. Monitoring meters 70 are employed to measure the quantities of pollutants in the soil at various stages of the operation and to ensure that harmful or illegal pollutants are not being introduced into the atmosphere.

Contaminated soil is deposited in the soil hopper 20 and is gravitationally fed through exit gate 25 onto a conveyor belt 42 which is formed of a continuous loop over rollers 44 located at each end of the belt 42. The first conveyor system 40 is driven by a motor 48, operably connected to a power source 50, via a drive chain or belt 46. The contaminated soil passes under the catalyst hopper 30 which deposits a predetermined amount of catalyst onto the soil through exit gate 35 of the catalyst hopper 30.

The soil and catalyst combination is moved by the first conveyor system 40 and is thereby deposited into the mouth 83 of the turning trommel 80. A sprayer unit 60 is situated also at the mouth 83 of the turning trommel 80 and may include an oxidant input and a water input. A sprayer nozzle 69 directs the desired spray into the mouth 83 of the turning trommel 80.

Although other effective formations may be used to aid in mixing the soil, one embodiment of the inner surface of the turning trommel 80 is depicted in FIGS. 3, 7, 8 and 9. A series of rectangular shaped teeth 82 are positioned around the inner wall 81 of the trommel 80. The teeth 82 are spaced apart and may be positioned on edge at a 45° angle from a line, indicated by numeral 87, running through the trommel wall 81 which line is parallel to the rotational axis of the trommel.

The trommel 80 may include a cirumferentially disposed cogged portion 88 which operably engages a gear 94 that is driven by the motor 90, which is in turn powered by the power source 50 through the control panel 55. The soil, oxidant and catalyst are mixed within the turning trommel 80, and the mixture passes out a discharge portion 86 of the trommel 80 through an exit spout 89 which remains in a fixed position while the trommel 80 turns.

According to one embodiment, an air filter unit 100 is positioned proximate to the discharge portion 86, and above the spout 89, of the trommel 80. The air filter unit 100 may consist of a vapor collection hood 104, a vacuum source 106, a vapor transport hose 108, and a drum-type filtration canister 109.

As pictured in FIGS. 3 and 4, the soil mixture is gravitationally fed from the spout 89 onto a conveyor belt 112 of a second conveyor system 110. Similarly to the first conveyor system 40, the second conveyor system 110 includes a continuous loop conveyor belt 112 positioned around rollers 114 and driven by a motor 118, operably connected to a power source 50, via a drive chain or belt 116.

The second conveyor system 110 transports the soil mixture so that the mixture is exposed to ultra-violet radiation emanating from an ultra-violet light unit 120 which is also powered by the power source 50 through the control panel 55. Finally, the treated soil is exited from the soil processing unit 10 by the second conveyor system 110.

Meters 70 (one shown in FIG. 1) are utilized to monitor the pollutant levels of the soil during various stages of the process, the efficiency of the air filter unit 100, and to ensure that pollutants are not discharged into the surrounding atmosphere.

SYSTEM OPERATION

Basically, the system operates to perform an organic chemical remediation of soil contaminated by fuel hydrocarbons, heavy metals, and the like, by the oxidation of those contaminating substances which renders them non-toxic according to governmental standards.

Hydrogen peroxide is a preferred oxidant because it is readily available, inexpensive, and its liquid state renders it suitable for efficient field use. An embodiment of the subject method utilizes hydrogen peroxide as an oxidant which is introduced to the contaminated soil by the sprayer unit 60 positioned at the mouth 83 of the turning trommel 80.

Hydrogen peroxide has long been known to oxidize many classes of noxious organic compounds, including: aliphatic hydrocarbons (saturated alkanes unreactive; unsaturated compounds form epoxides and polyhydroxy compounds); alcohols (with catalyst); glycols, epoxides; aldehydes, ketones (with catalyst); carboxylic acids; amides; nitriles; amines; azo compounds, hydrazine derivatives; nitrosamines; thiols (with catalyst); sulfides, disulfides; benzene and substituted benzene (with catalyst); nitrophenolic compounds; fused polycyclic hydrocarbons; fused non-alterant polycyclic hydrocarbon; heterocyclic nitrogen compounds; and heterocyclic oxygen compounds. (Source: *Remedial Action of Waste Disposal Sites*, (Revised) EPA/625/6-85/006, USEPA Office of Research and Development, Hazardous Waste Engineering Research Laboratory, Cincinnati, Ohio, October 1985, pp. 9-55).

It follows that contaminates which are treatable by the preferred embodiment of the subject method include fuel hydrocarbons, oils, heavy metals, industrial solvents including ketones and aldehydes, various reagents and preservatives, and mixtures of those contaminates.

Peroxide cleaves aromatic ring structures, and oxidizes the resulting straight- or branched-chain alkenes. Oxidation proceeds through a series of progressively shorter hydrocarbon chains, eventually resulting in carbon dioxide and water. A primary advantage to using peroxide is that it leaves no hazardous residue itself. (Unlike oxidants such as chlorine, which can be acutely toxic and produce toxic chlorinated hydrocarbons).

However, mere peroxide treatment under normal conditions is subject to two major drawbacks. First, hydrogen peroxide reacts very slowly with saturated alkanes, which make up nearly two-thirds of a typical unleaded gasoline. Second, those reactions do not achieve completion.

Additionally, direct peroxide addition to soil gives an uncontrolled, highly exothermic reaction. The resulting heat volatizes most of the gasoline before it can be rendered non-toxic. The heat also drives off the intermediate decomposition products which, especially mercaptans, can be more noxious than the original compounds.

These factors, therefore, constitute an unacceptable air pollution problem which precludes mere peroxide treatment in the open air. Accordingly, in one embodiment of the present invention the hydrogen peroxide exits the sprayer unit 50 directly into the turning trommel 80.

To control and enhance the oxidation process, release of the hydrogen peroxide may be controlled by an adsorbent catalyst. According to one embodiment of the subject invention, a proprietary catalyst, "Bondox", is utilized. "Bondox" is a nontoxic silicate-based inorganic polymer and it is applied as a finely divided, high surface area farinose powder. The silicate matrix of the catalyst has been expanded by high temperatures, creating frankel-type defects which become active sites where hydrogen peroxide and gasoline constituents can be adsorbed.

The active sites facilitate peroxide decomposition to singlet oxygen, a highly reactive species. Singlet oxygen reacts with saturated alkanes as well as unsaturated and aromatic species. "Bondox" resorbs the intermediate decomposition products, which partially broken-down species are attacked again by the singlet oxygen, and the process continues until essentially complete decomposition to carbon dioxide and water is achieved.

The general reaction sequence may be written, where R indicates alkyl (branched or straight), as follows: 1. $RCH_2CH_3$+"Bondox"—$RCH_2CH_3$ (adsorbed); 2.$H_2O_2$+"Bondox"—$H_2O_2$ (adsorbed); 3.$H_2O_2$ (adsorbed) —$H_2O$ (desorbed)+O (desorbed); 4.2O+$CH_3CH_2$ (adsorbed)—$H_2O$+HCO—$CH_2R$ (adsorbed); 5.O+HCO—$CH_2R$ (adsorbed)—$HOOCCH_2R$ (adsorbed); 6.2O+$HOOCCH_2R$ (adsorbed)—$H_2O$ (desorbed)+$CO_2$ (desorbed)+HCO—R (adsorbed).

Aromatic structures, such a benzene and its derivatives, undergo ring opening first, and then follow the aforementioned sequence. Steps 4 through 6 continue until complete degradation: is achieved.

As a side reaction, the active sites on the "Bondox" also react with cations, specifically heavy metals. The metals are converted into metal silicates which are considered non-pollutant under current governmental standards. In this way, metal contamination from leaded gasoline, waste motor oil, or other sources, is treated.

The "Bondox" catalytic compound adsorbs the hydrogen peroxide where it is held in close proximity to the organic compound(s) targeted for oxidation. Emissions from volatile organic compounds are also adsorbed and oxidized by the peroxide, thereby controlling and minimizing air emissions and odors.

The subject method of soil decontamination begins with the adding of soil, as indicated by the directional arrow numbered 12 in FIG. 1, to the soil hopper 20. The soil is selectively allowed to flow through the exit gate 25 and out of the soil hopper 20. The soil is then gravitationally fed onto the conveyor belt 42 of the first conveyor system 40 and is transported, in layers approximately four to eight inches deep, under the catalyst hopper 30 to the mouth 83 of the turning trammel 80 and deposited therein. The conveyor belt 42 forms a continuous loop around the roller 44 and is driven, via the drive chain 46, by a motor 48 which is operably coupled to the power source 50 through the control panel 55.

As the soil passes under the catalyst hopper 30, the catalyst flows through exit gate 35 and is deposited on top of the passing soil. According to one embodiment of the present invention, the ratio of "Bondox" to soil corresponds to the particular soil but generally may average one part "Bondox" to four parts of soil. In one embodiment of the present invention, the amount of catalyst released from the hopper 30 is controlled by an electric exit gate 35 powered by a motor 37 which is operably connected to the power source 50 via the control panel 55.

According to an embodiment, the sprayer unit 60 joins an oxidant input and a water input and directs a spray of the mixture through a sprayer nozzle 69, into the turning trommel 80. Although different soils may require different ratios, generally the proportional mixture of the spray will fall in the range of five to ten parts water for every part of hydrogen peroxide, and the spray will be applied at a rate of approximately five quarts of spray mixture for every four cubic feet of soil. In this manner and supplemented by the air filtration unit hereinafter discussed, the chemical reactions leading to decontamination take place so that toxic substances are not released into the atmosphere.

The soil, catalyst and oxidant are mixed together within the turning trommel 80. The power source 50, a generator in one embodiment, runs the motor 90 causing the gear 94 to rotate. The gear 94 operably engages the cogged portion 88 of the trommel to impart rotation thereon. Typically, the soil mixture will be turned over six times while passing through the trommel 80. The vast majority of decontamination occurs, then, within the confines of the trommel 80 before the soil mixture exits the trommel 80 through a discharge portion 86 thereof.

After exiting the trommel 80, the soil mixture is gravitationally fed onto the second conveyor system 110, more specifically the conveyor belt 112 thereof. The conveyor belt 112 forms a continuous loop around the rollers 114 and is driven, via a drive chain 116, by a motor 118 which is operable connected to the power source 50 and which is electrically controlled through the control panel 55.

As illustrated in FIGS. 2, 5 and 6, the second conveyor system 110 may be disposed on a secondary trailer 130 which is pivotally and detachably coupled, by an attaching pivot member 131, to the trailer 15. The secondary trailer 130 may also include an elevating means 135 for adjusting the height of the exit end of the second convey belt 112. It is understood that elevating means 135 other than the hydraulic system illustrated may be employed, for example cross-members, threaded members with collars, etc. The wheels 133 may completely pivot around a vertical axis thereof so that the secondary trailer 130 may be moved to deposit the treated soil in an arc radiating from the attaching pivot member 131 as best illustrated in FIG. 6.

Although the subject decontamination system is designed so that no significant off-gassing of pollutants results, an air filter unit 100 may be employed to ensure that contaminates are not released into the surrounding air.

As best illustrated in FIGS. 1, 3 and 4, the air filter unit 100 of one embodiment includes a vapor collection hood 104 (positioned above the trommel spout 89), a vacuum source 106, a vapor transport hose 108, and a filtration canister 109. The vacuum source 106 is operably connected through the control panel 55 to the power source 50. The filter unit 100 creates air flow both from the mouth 83 and from the discharge portion 86 of the turning trommel 80 into the vapor collection hood 104. The vapor travels through the transport hose 108 and passes through a filter canister 109 which may be of a carbon filtration or similar type to trap any pollutants before they can be released into the atmosphere. Another embodiment (not shown) of the filter unit 100 includes the transport hose 108 being coupled to a side portion of the collection hood 104.

One embodiment of the soil decontamination system utilizes a filter unit 100 composed of a Calgon-Carbon Filtration System. The rate of flow of the filtration system is variable from approximately 30 to 300 cubic feet per minute and the system is specifically for filtration of hydrocarbons and other organic vapors.

As the soil mixture is transported from the trommel 80, it passes under an ultra-violet light unit 120 which exposes the soil mixture to ultra-violet radiation to further cause oxidation of the remaining contaminates. The time of radiant exposure is variable, but is generally between thirty and sixty seconds. The ultra-violet light unit 120 may include a support structure 122 and a plurality of ultra-violet light sources 125, such as ultra-violet light bulbs.

Using the preferred method described herein, the subject apparatus can treat approximately 60 cubic yards of contaminated soil in one hour. Among others, the disclosed process treats 428 different waste substances designated by separate codes and types from the listing found in 40 C.F.R. $261, and the principal by-products of the remediation are carbon dixide and water. It is understood that highly contaminated soils may be processed in the above-described manner more than once. For example, high concentrations of fuel hydrocarbons may require that the soil be passed through the system twice or even three time before it is effectively decontaminated.

Field tests indicate that a one time treatment, according to the subject invention, of soil containing 2,975 p.p.m. total fuel hydrocarbon resulted in a removal efficiency of 73.8% T.F.H., 89.5% Benzene, 86.0% Toluene and 80.8% Xylene and Ethyl-Benzene. Tests also indicate that removal efficiency rates of 99.9% are achieved upon two or three treatments.

While the invention has been particularly shown and described in reference to the preferred embodiments thereof, it will be understood by those skilled in the art that changes in form and details may be made without departing from the spirit and scope of the invention.

I claim:

1. An apparatus for decontaminating soil, comprising:
   a mixer;
   a first conveyer having an output end connected to an input of said mixer;
   first hopper means for holding said soil and distributing it onto an input end of said first conveyer;
   second hopper means for holding a catalytic compound and adding it to said distributed soil;
   introduction means for introducing an oxidant into said input end of said mixer, said mixer being operable to mix said soil, catalyst and oxidant and thereby provide mixed soil;
   a second conveyer operable to collect said mixed soil from an output end of said mixer; and
   means for radiating said collected mixed soil with ultraviolet light.

2. The apparatus of claim 1 wherein said mixer is a trommel having an inner wall whereon a plurality of rectangular teeth are fixedly disposed.

3. An apparatus for performing soil decontamination as in claim 1 wherein said oxidant is in a liquid state and wherein said introduction means comprises a sprayer mechanism.

4. An apparatus for performing soil decontamination as in claim 3 further comprising trailer means for supporting thereon said mixer, said radiating means and said first and second conveyors, said trailer means having means for detachably coupling to a truck.

5. An apparatus for performing soil decontamination as in claim 4 wherein said trailer means comprises a first trailer and a second trailer, said second trailer being detachably and pivotally coupled to said first trailer and being disposed to support said second conveyor and having the capability to raise and lower at least one end of said second conveyor.

6. In the method of soil decontamination, the steps of:
   conveying said soil and a catalyst to a mixer;
   depositing said soil, said catalyst and an oxidant within said mixer;
   mixing said soil, said catalyst and said oxidant within said mixer, thereby forming a mixture;
   transporting said mixture from said mixer; and
   radiating said transported mixture with ultra violet light.

7. In the method of claim 6, wherein the step of conveying includes the steps of:
   gravitationally feeding said soil onto a first conveyor belt; and
   depositing said catalyst upon said soil on said first conveyor belt.

8. In the method of claim 6 wherein said oxidant is in a liquid state and the step of depositing includes the step of spraying said oxidant into said mixer.

9. In the method of claim 8 wherein said oxidant is a mixture of approximately five to ten parts of water and one part of hydrogen peroxide.

10. In the method of claim 9 wherein said oxidant is applied at a rate of approximately five quarts of oxidant for every four cubic feet of soil.

11. In the method of claim 6, the additional steps of:
drawing vapors from said mixer; and
filtering said vapors.

12. In the method of claim 6 wherein said oxidant includes hydrogen peroxide.

13. In the method of claim 6 wherein said catalyst is a silicate based inorganic polymer.

14. In the method of claim 13 wherein the ratio of soil to catalyst is four to one.

* * * * *